F. B. PRESTON.
Hand-Seeder.
No. {575, 31,579.}
Patented Feb. 26, 1861.
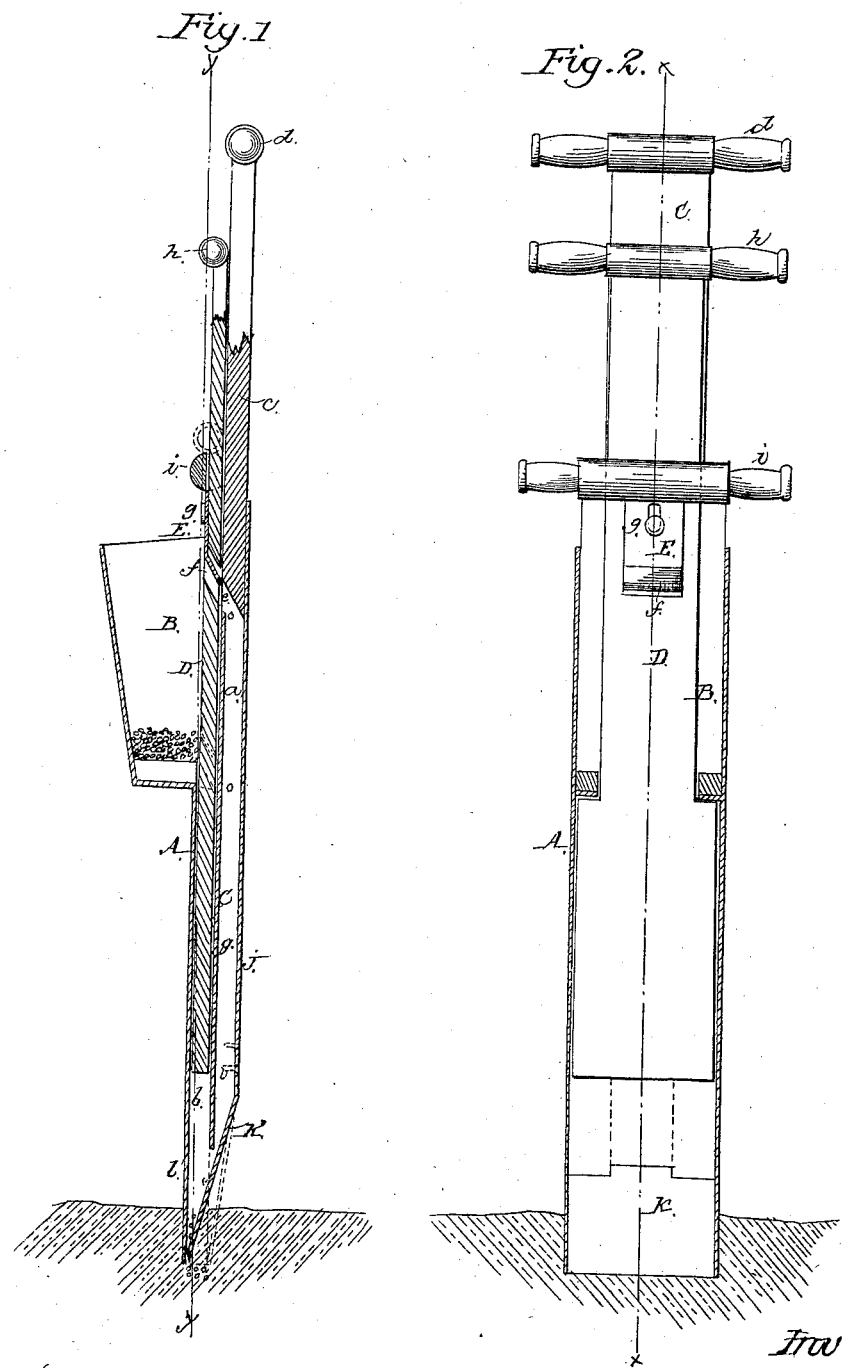

UNITED STATES PATENT OFFICE.

F. B. PRESTON, OF FAYETTE, MISSOURI, ASSIGNOR TO HIMSELF AND
W. H. STAPLETON, OF SAME PLACE.

IMPROVEMENT IN CORN-PLANTERS.

Specification forming part of Letters Patent No. 31,579, dated February 26, 1861.

*To all whom it may concern:*

Be it known that I, F. B. PRESTON, of Fayette, in the county of Howard and State of Missouri, have invented a new and Improved Hand Corn-Planter; and I do hereby declare that the following is a full, clear, and exact description of the same, reference being had to the annexed drawings, making a part of this specification, in which—

Figure 1 is a longitudinal section of my invention, taken in the line $x\,x$, Fig. 2; Fig. 2, a longitudinal section taken in the line $y\,y$, Fig. 1.

Similar letters of reference indicate corresponding parts in the two figures.

The object of this invention is to obtain a simple corn-planter for manual operation, that may be worked with facility and not be liable to choke or clog—a contingency of frequent occurrence with the generality of all hand-planters that have passed under my observation.

The invention consists in the employment or use of three handles in connection with a slide, hopper, tube, and spring-plate, all arranged substantially as hereinafter shown and described to effect the desired end.

A represents a rectangular tube, at the upper part of which there is a hopper, B; and C is a longitudinal partition in the tube, said partition dividing the tube A into two compartments, $a\,b$, as shown clearly in Fig. 1.

In the upper part of the compartment $a$ there is secured a plate, $c$, which extends some distance above the hopper B, and has a handle, $d$, attached to its end at right angles, as shown clearly in Fig. 2. Between the upper end of the partition C and the lower end of the plate $c$ there is an opening, $e$, the use of which will be presently explained.

In the compartment $b$ of the tube A there is placed a slide, D, which has an oblique opening, $f$, made in it, the capacity of which may be regulated by an adjustable plate, E, secured at the desired point by a set-screw, $g$. The slide D extends down a suitable distance within the compartment $b$, and a handle, $h$, is attached to its upper end at right angles, as shown in Fig. 2. A handle, $i$, is also attached to the plate $c$ at a point just above the hopper B.

At the lower end of the back plate, $j$, of the tube A there is screwed a spring-plate, $k$, which, when not acted upon by an extraneous force, keeps by its own elasticity its lower end in contact with the front plate, $l$, of tube A, and thereby closes the end of said tube, as will be fully understood by referring to Fig. 1.

The tube A and hopper B may be of metal, and the slide D and plate $c$ of wood. At the lower end of the partition $c$ there is a notch, $m'$, which affords a communication between the two compartments $a\,b$.

The operation of the machine is as follows: The hopper $b$ is supplied with a requisite quantity of seed, and the operator, in commencing work, first draws up the thill D, and then grasps both handles $d\,h$ and shoves the end of the tube A into the ground the required distance the seed is to be planted. It is preferable to shove the tube a little obliquely into the ground, so that the seed may be readily covered. When the slide D is drawn upward to its fullest extent the opening $f$ in the slide registers with the opening $e$, and opening $f$, which was filled with seed when the slide was previously forced down, discharges its contents through opening $e$ into the compartment $a$ of the tube A. When therefore the end of tube A is forced into the ground there is a quantity or a "planting" of seed in the lower end of the tube. When the end of tube A is shoved into the ground a proper distance the operator grasps the two handles $h\,i$, the handle $d$ being released, and draws the two handles $h\,i$ toward each other. By this means the slide D is forced down and the tube A withdrawn from the ground, and the slide D forces the seed in the lower end of the tube out into the hole made in the ground by the tube, the withdrawal of the tube enabling the slide D to readily force back plate $k$, owing to the taper form of the lower part of the tube. As the end of the tube is forced into the ground in a closed state, it follows as a matter of course that it cannot become choked or clogged with earth. Thus it will be seen that by this arrangement of handles, and slide, and tube, the implement may be manipulated in such a way as to facilitate the planting and prevent the choking of the implement. After the seed is discharged from the tube, the operator, by grasping the handle $h$ and releasing handle $i$, will allow the tube to drop by its own gravity, so that the implement will be in readiness for a succeeding operation.

I am aware that substantially the same seed-distributing arrangement as that herein shown and described has been previously used, and I therefore do not claim, separately, such device; but I do claim as new and desire to secure by Letters Patent—

The combination of the three handles $d\ h\ i$, with the slide D, tube A, and hopper B, one of the handles, $h$, being attached to the slide, and the other two being attached to plate $c$, as and for the purpose set forth.

F. B. PRESTON.

Witnesses:
    CHAS. H. STEWART,
    WM. P. JACKSON.